(12) United States Patent
Waddington et al.

(10) Patent No.: US 12,474,948 B2
(45) Date of Patent: Nov. 18, 2025

(54) ACCELERATED ENCODING FOR VIRTUAL MACHINE SYNCHRONIZATION

(71) Applicant: International Business Machines Corporation, Armonk, NY (US)

(72) Inventors: Daniel Waddington, Morgan Hill, CA (US); Saransh Gupta, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 728 days.

(21) Appl. No.: 17/871,565

(22) Filed: Jul. 22, 2022

(65) Prior Publication Data
US 2024/0028364 A1 Jan. 25, 2024

(51) Int. Cl.
*G06F 9/455* (2018.01)
(52) U.S. Cl.
CPC .. *G06F 9/45558* (2013.01); *G06F 2009/4557* (2013.01); *G06F 2009/45583* (2013.01)
(58) Field of Classification Search
CPC ......... G06F 9/45558; G06F 2009/4557; G06F 2009/45583; G06F 16/27; G06F 3/0614;
(Continued)

(56) References Cited

U.S. PATENT DOCUMENTS 9,020,895 B1 4/2015 Rajashekar et al.
9,262,434 B1 2/2016 Shilane et al.
(Continued)

FOREIGN PATENT DOCUMENTS

CN 107798063 A 3/2018
CN 119547061 A 2/2025
(Continued)

OTHER PUBLICATIONS

International Searching Authority, PCT/CN2023/094952, Jun. 23, 2023.

(Continued)

*Primary Examiner* — Hosain T Alam
*Assistant Examiner* — Zubair Ahmed
(74) *Attorney, Agent, or Firm* — Garg Law Firm, PLLC; Rakesh Garg; Michael O'Keefe

(57) ABSTRACT

An embodiment includes a virtual machine (VM) memory synchronization process for improved failure tolerance. The process includes writing, by an intelligent memory controller (IMC), current snapshot data to a first series of contiguous memory addresses, where the current snapshot data is received by the IMC from a memory of an active VM via a direct memory access (DMA) transfer operation. The IMC executes concurrent threads associated with respective spans of the contiguous memory addresses, where the concurrent threads control compression processing of respective portions of the current snapshot data resulting in corresponding portions of processed current snapshot data, where the concurrent threads comprise a thread bound to a hardware accelerator that performs the compression processing of a portion of the current snapshot data. The process then transmits the processed current snapshot data to a standby VM as a current synchronization snapshot of the active VM.

20 Claims, 12 Drawing Sheets

(58) Field of Classification Search
CPC .................... G06F 3/065; G06F 3/067; G06F 2009/45579; G06F 16/11
USPC .................................................. 711/206, 203
See application file for complete search history.

(56) References Cited

U.S. PATENT DOCUMENTS

| | | | |
|---|---|---|---|
| 10,732,621 | B2 | 8/2020 | Cella et al. |
| 10,795,350 | B2 | 10/2020 | Cella et al. |
| 10,877,847 | B2 | 12/2020 | Artico et al. |
| 11,308,034 | B2 | 4/2022 | Ahn et al. |
| 11,385,623 | B2 | 7/2022 | Cella et al. |
| 2016/0011946 | A1 | 1/2016 | Simon et al. |
| 2016/0048408 | A1 | 2/2016 | Madhu et al. |
| 2019/0278482 | A1 | 9/2019 | Dubeyko et al. |
| 2019/0370124 | A1 | 12/2019 | Sadavarte et al. |
| 2020/0110546 | A1 | 4/2020 | Natanzon et al. |
| 2020/0110670 | A1* | 4/2020 | Artico ................. G06F 11/1438 |
| 2020/0409803 | A1 | 12/2020 | Naidu et al. |

FOREIGN PATENT DOCUMENTS

| | | |
|---|---|---|
| DE | 112023003181 T5 | 5/2025 |
| GB | 2635483 A | 5/2025 |
| JP | 2025-500320 A | 1/2025 |
| WO | 2024/016811 A1 | 1/2024 |

OTHER PUBLICATIONS

VMware, Using VMware Cloud Disaster Recovery, VMware Cloud Disaster Recovery, Mar. 13, 2022.
Christophe, Using VMWare Cloud DR to protect VMs in an SDDC. (Part 2—Protecting VMs), Dec. 17, 2021, https://vminded.com/index.php/2021/12/17/using-vmware-cloud-dr-to-protect-vms-in-an-sddc-part-2-protecting-vms/.
Xu et al., Adaptive Granularity Encoding For Energy-Efficient Non-Volatile Main Memory, 2019 56th ACM/IEEE Design Automation Conference (DAC), Jun. 2-6, 2019.
Tang, Content Adaptive Encoding Method for High Frame Rate Screen-Camera Communication, Jan. 13, 2016.
Ma et al., High-Capacity Reversible Data Hiding in Encrypted Images using Adaptive Encoding, 2020.
Behnam et al., Adaptive Time-Based Encoding for Energy-Efficient Large Cache Architectures, E2SC'17: E2SC'17: Energy Efficient Supercomputing, Nov. 2017.
ip.com, Efficient Native Allocation Tracking Through Sub-Allocators for Checkpoint/Restore in Managed Runtimes, May 4, 2022.
ip.com, Optimal VM Creation to Improve Profitability: Identifying a Computer Server to Provision a Virtual Machine as a PaaS Cloud Service Provider, Intending to Utilize Unused Capacity and Increase Profitability, Oct. 4, 2021.
ip.com, Dynamic Deployment of Large Scale Virtual Machines in Cloud Environment, Mar. 28, 2016.
Waddington et al. "A case for using cache line deltas for high frequency VM snapshotting", SoCC '22: Proceedings of the 13th Symposium on Cloud Computing, Nov. 7, 2022, pp. 526-539.

* cited by examiner

ACCELERATED ENCODING FOR VIRTUAL MACHINE SYNCHRONIZATION

BACKGROUND

The present invention relates generally to a method, system, and computer program product for virtual machines and management of computer clusters. More particularly, the present invention relates to a method, system, and computer program accelerated encoding for virtual machine synchronization.

A virtual machine (VM) is a software-defined computer and guest OS running on a host system that operates its own host OS. A VM comprises virtualized representations of various components of a data processing system. Generally, a VM provides a software execution environment and may have a virtual processor, virtual main memory, virtual disk storage, and possibly various other virtual devices. VMs represent a form of system virtualization implemented through some managing functionality, typically hypervisor technology.

The host system is a data processing system, such as a server. The host system may have any number of VMs configured thereon depending on the available system resources of the host and the demands of the VMs. For example, in large scale data processing environments, such as a data center, hundreds or thousands of VMs may be operating on a host at any given time, and hundreds or thousands of such hosts may be operational in the data center at any given time. A large-scale virtualized data processing environment such as this is capable of providing computing resources to many different clients on an as-needed basis.

SUMMARY

The illustrative embodiments provide for accelerated encoding for virtual machine synchronization. An embodiment includes writing, by an intelligent memory controller (IMC), current snapshot data to a first series of contiguous memory addresses, wherein the current snapshot data is received by the IMC from a memory of an active virtual machine (VM) via a first direct memory access (DMA) transfer operation. The embodiment also includes executing, by the IMC, concurrent threads associated with respective spans of the contiguous memory addresses, where the concurrent threads control compression processing of respective portions of the current snapshot data resulting in corresponding portions of processed current snapshot data, where the concurrent threads comprise a first thread bound to a hardware accelerator that performs the compression processing of a first portion of the current snapshot data. The embodiment also includes transmitting the processed current snapshot data to a standby VM as a current synchronization snapshot of the active VM. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
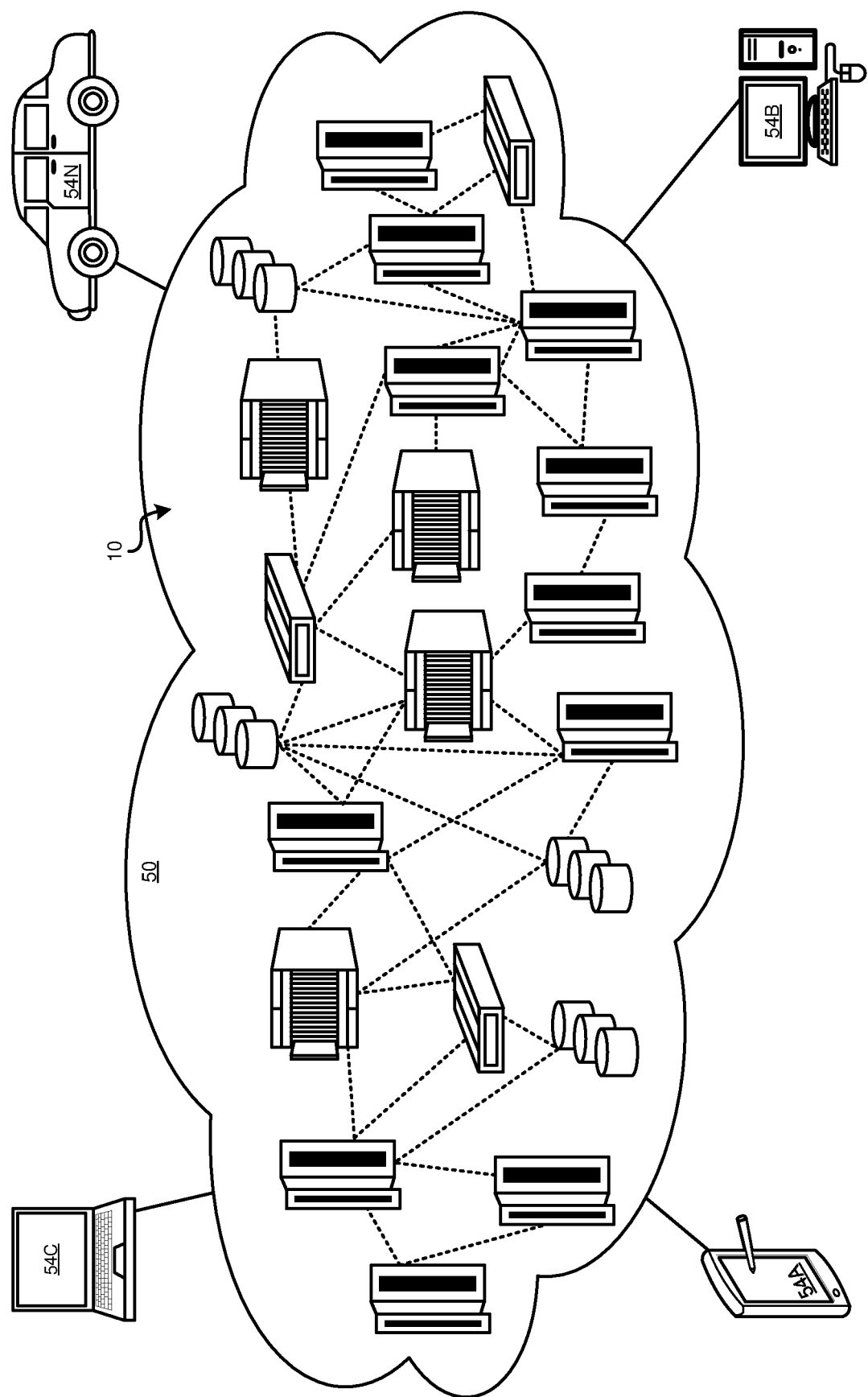
FIG. 1 depicts a cloud computing environment according to an embodiment of the present invention.

Active-standby schemes are examples of high-availability architectures for VMs in which a standby VM is periodically synchronized with an active VM that is in use. The periodic synchronization typically involves updating the main memory (e.g., DRAM) and the CPU state of the standby VM to match those of the active VM. This synchronization can be accomplished by using page tables and software to identify "dirty" memory pages of the active VM and in turn copy them to the standby VM.

Maintaining a periodically-synchronized standby VM reduces the amount of data that needs to be transferred during a VM failover and thereby reduces the period that a VM is suspended during the migration. However, there are problems with such techniques that negatively affect the functionality of VMs due to inefficiencies in the synchronization process. For example, these types of active-standby techniques use a synchronization process that involves significant page table traversal and data copying overhead, resulting in considerable VM downtime. A principal contributor to this overhead is that many applications using this approach incur data copy-amplification as a result of copying more data than is necessary; this arises because of the processor's virtual memory system design in which memory pages are 4 KiB or larger. For example, a single byte written to a page incurs a full 4 KiB (or larger) page copy during the next synchronization.

Aspects of the present disclosure address the deficiencies described above by providing mechanisms (e.g., systems, methods, machine-readable media, etc.) that perform high-frequency memory synchronization more quickly and efficiently than prior techniques. The present disclosure recognizes that existing page protection can be leveraged to reduce the number of pages that are compressed (i.e., process pages marked dirty only) for synchronization. The present disclosure also recognizes that host-to-device DMA engines can be used to pack (gather) sparse dirty pages of the active VM main memory so that they align with dense data computation that a hardware accelerator, such as a GPU or FPGA, is well suited to processing. This, in turn, allows the compression workload to be divided into chunks of packed data to support data parallelism. An output segment buffer can then be utilized to gather the encoded (compressed) data into contiguous memory for transmission to a standby VM. The present disclosure further recognizes that as soon as memory data has been copied to the hardware accelerator for compression, the active VM can continue assuming the epoch is greater than the total time it takes the hardware accelerator to encode the data and for the data to be transmitted to the standby VM.

Based on these observations, the mechanisms of the present disclosure provide for synchronization techniques that significantly reduce the amount of time involved in generating a synchronization snapshot of VM main memory and CPU state. The mechanisms of the present disclosure also provide for synchronization techniques that significantly the volume of data transmitted to a standby VM for synchronization. These mechanisms of the present disclosure result in a synchronization approach that reduces the downtime incurred by synchronizing a standby VM with an active VM and allows for active-standby schemes using disclosed synchronization techniques to be deployed across more limited bandwidth networks (e.g., across data centers) that were not feasible using prior synchronization techniques.

Where a computer or data processing system is described as a virtual machine, a virtual device, or a virtual component, the virtual machine, virtual device, or the virtual component operates in the manner of a data processing system using virtualized manifestation of some or all components of a data processing system. For example, in a virtual machine, virtual device, or virtual component, a processing unit is manifested as a virtualized instance of all or some number of hardware processing units available in a host data processing system, main memory is manifested as a virtualized instance of all or some portion of main memory that may be available in the host data processing system, and disk memory is manifested as a virtualized instance of all or some portion of disk memory that may be available in the host data processing system.

In an illustrative embodiment, an active-standby synchronization process includes, once per epoch, an active host pausing a running active VM and identifying pages of the VM memory that have changed during the present epoch (i.e., dirty pages). In some embodiments, after the active VM has been suspended, the VM cache is flushed, and the hypervisor iterates through a dirty page bitmap (a collection of bits representing the clean/dirty state of each page in the guest VM memory). Next, the synchronization process uses the dirty page bitmap to construct a segment list, which is an array of non-contiguous dirty spans, where each element of the array includes respective segment offset, length pairs corresponding to identified contiguous dirty spans in the VM memory (i.e., two adjacent dirty pages combine into a region defined by an element of the array).

In an illustrative embodiment, the synchronization process includes a DMA controller that performs a DMA transaction to transfer the non-contiguous dirty spans of the VM memory to a series of contiguous memory addresses of a guest current memory buffer of an intelligent memory controller (IMC). In some embodiments, the segment list is used to copy the contents of the non-contiguous dirty spans via the DMA transaction into the guest current memory buffer of the IMC in packed form (i.e., in contiguous addresses). Also, the segment list is then used to copy the contents of the non-contiguous dirty spans to guest current memory of the active host.

In an illustrative embodiment, the IMC includes a processor, preferably a hardware accelerator such as a GPU or FPGA, that performs multi-threaded parallelized encoding processing of the dirty pages received from the active host. Data in the VM guest's current memory buffer and in the guest's prior memory buffer is all packed so as to occupy a continuous span of memory addresses in each buffer. The packed data is logically partitioned into "chunks" that can be encoded by separate threads. In some embodiments, the chunk information buffer stores information about each chunk, for example a plurality of segment offset, length pairs corresponding to respective chunks. The size of the chunks must be sufficient to provide the granularity needed to parallelize across N worker threads, where N is a limitation of the underlying hardware (e.g., for GPU nominally 2048 threads). For example, in some embodiments, each separate thread performs encoding on one or more chunks and creates a chunk-level result in the pre-transmit encoded delta buffer. In some embodiments, the encoding includes XOR-RLE encoding. While illustrative embodiments are described herein as using XOR-RLE encoding, other types of encoding may be used in alternative embodiments. For example, alternative embodiments use LZ4 or DEFLATE encoding with or without XOR.

The number N of worker threads can vary significantly for different target devices, being as small as 8-16 for a typical FPGA, limited by the concurrent memory access the device can support. In such cases, we can use sub-threads (sub-kernels) to pipeline the memory accesses within a thread, achieving much higher logical threads.

In an illustrative embodiment, the synchronization process proceeds based on the result of a comparison of the size of the XOR+RLE compressed chunk to the original chunk size. If the compressed version is larger, e.g., due to high entropy modifications, then the original contents of the chunk (in guest current memory buffer) are copied to a pre-transmit encoded delta buffer on the IMC. Otherwise, the compressed version is copied to the pre-transmit encoded delta buffer. This comparison is made for each chunk individually until they have all been processed and stored in the pre-transmit encoded delta buffer.

In an illustrative embodiment, the synchronization process transfers the contents of the pre-transmit encoded delta buffer back to the encoded delta result buffer on the active host. The process then transmits the results of the encoding processing as a memory snapshot to the standby host for decoding and updating the VM memory of a standby VM.

In an illustrative embodiment, the standby host receives the memory snapshot from the active host. The standby host then iterates through each segment or chunk of the snapshot. For each segment, the process proceeds based on whether the current segment under evaluation is XOR-RLE encoded or plain data. If it is encoded, then the standby host performs decoding processing on the segment of data, for example by performing RLE-expansion on each of the chunks that are marked as compressed. Next, the decoder performs an XOR operation on each chunk marked as compressed. In some embodiments, the XOR operation is performed directly in the standby guest VM main memory at the location indicated by the segment info offsets in the segment information that was transmitted from the active VM with the memory snapshot. If, instead, the segment is plain data, then the plain value of the data is extracted from the segment and copied to a region of memory derived by parsing of the original segment list. The iterations of this process continue until all of the synchronization data has been processed and the updates applied to the memory of the standby VM.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
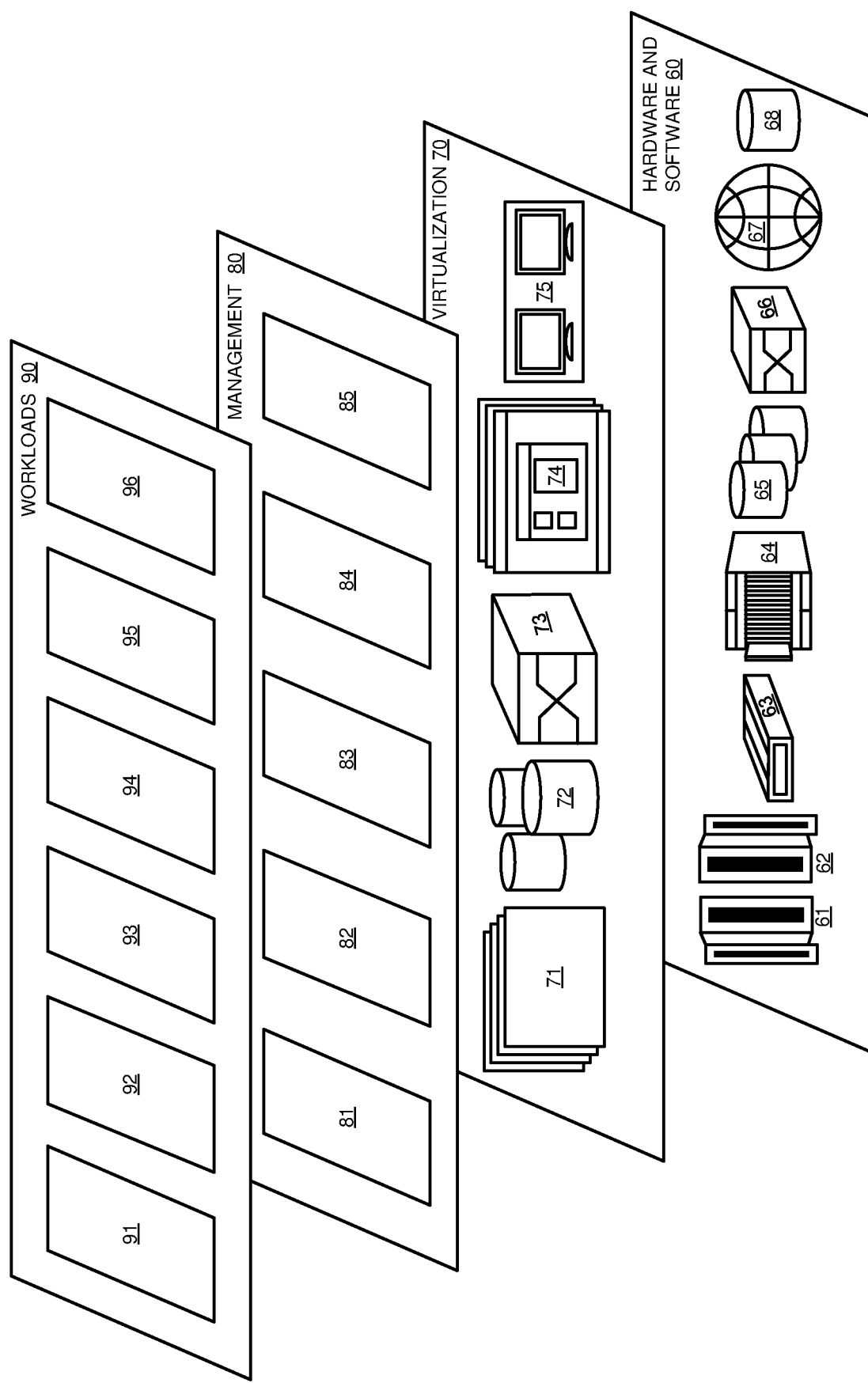
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in the context of the illustrated embodiments of the present disclosure, various workloads and functions 96 for virtual machine management processing, including processing for synchronizing two separate memory spaces and facilitating high availability (HA) of a running VM. In addition, workloads and functions 96 may include such operations as data encoding/decoding and memory management, as described herein. In some embodiments, the workloads and functions 96 also works in conjunction with other portions of the various abstraction layers, such as those in hardware and software 60, virtualization 70, and management 80 to accomplish the various purposes of the disclosed embodiments.

Figure 3:
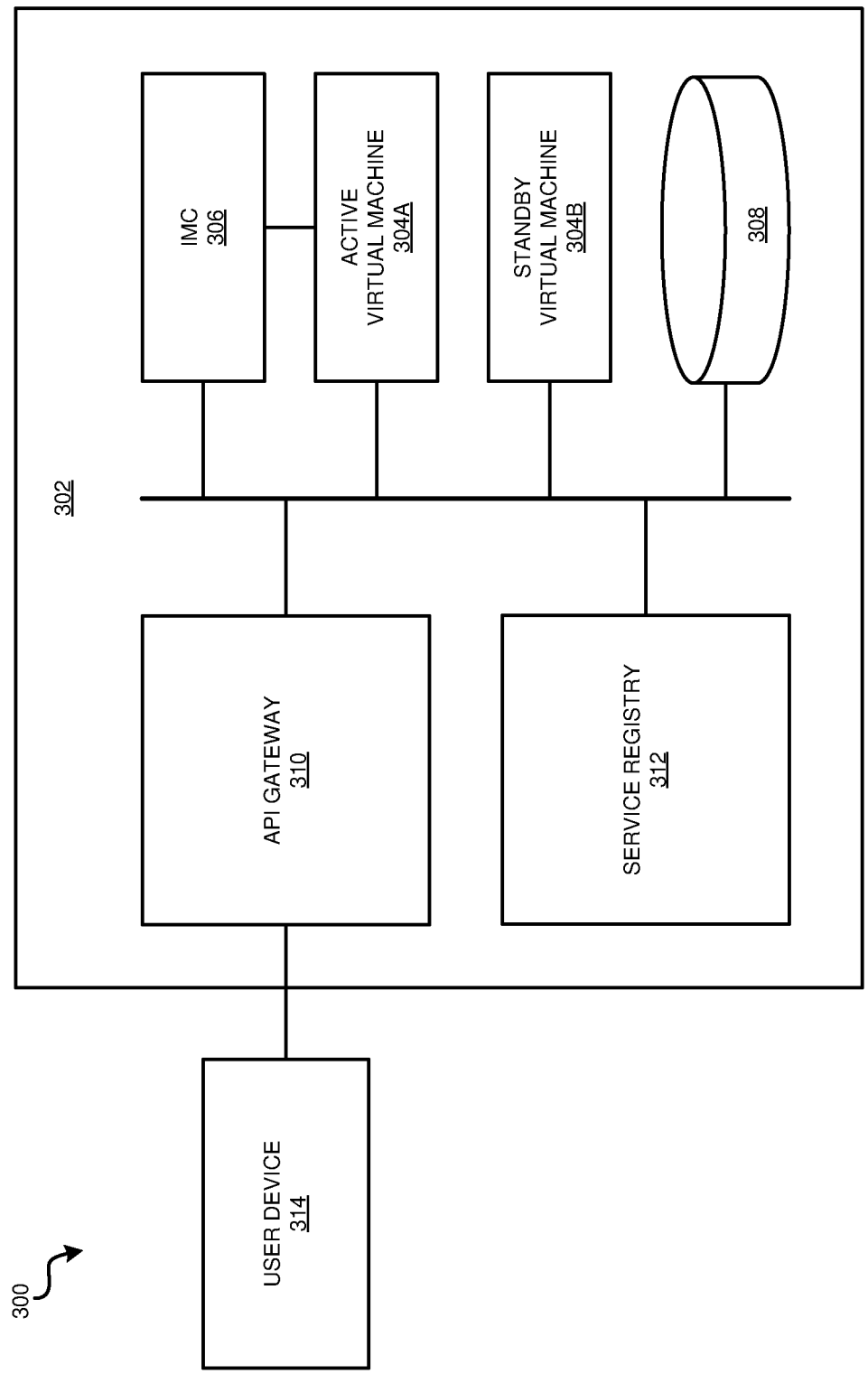
FIG. 3 depicts a block diagram of an example cloud computing environment in accordance with an illustrative embodiment.

With reference to FIG. 3, this figure depicts a block diagram of an example cloud computing environment 300 in accordance with an illustrative embodiment. In the illustrated embodiment, the cloud computing environment 300 includes service infrastructure 302 that includes an intelligent memory controller (IMC) 306 that provides for high-frequency memory synchronization between an active virtual machine 304A and a standby virtual machine 304B in accordance with an illustrative embodiment. In some embodiments, the IMC 306 is deployed in workloads layer 90 of FIG. 2. By way of example, in some embodiments, the IMC 306 is implemented using virtual machine management processing 96 of FIG. 2.

In the illustrated embodiment, the service infrastructure 302 provides services and service instances to a user device 314. User device 314 communicates with service infrastructure 302 via an API gateway 310. In various embodiments, service infrastructure 302 and its associated virtual machine 304A serve multiple users and multiple tenants. A tenant is a group of users (e.g., a company) who share a common access with specific privileges to the software instance. Service infrastructure 302 ensures that tenant specific data is isolated from other tenants.

In the illustrated embodiment, service infrastructure 302 includes a service registry 312. In some embodiments, service registry 312 looks up service instances of virtual machine 304A in response to a service lookup request such as one from API gateway 310 in response to a service request from user device 314. For example, in some embodiments, the service registry 312 looks up service instances of virtual machine 304A in response to requests related to experience encapsulation processing from the user device 314.

In some embodiments, the service infrastructure 302 includes memory 308, which comprises computer readable storage media. In some embodiments, the service infrastructure 302 includes one or more instances of virtual machines, including the active virtual machine 304A and the standby virtual machine 304B. In some such embodiments, each of the multiple instances of the virtual machines run independently on multiple computing systems. In some such embodiments, the active virtual machine 304A and the standby virtual machine 304B, as well as other service instances of virtual machines, are registered in service registry 312.

In some embodiments, service registry 312 maintains information about the status or health of each service instance including performance information associated each of the service instances. In some such embodiments, such information may include various types of performance characteristics of a given service instance (e.g., cache metrics, etc.) and records of updates.

In some embodiments, user device 314 connects with API gateway 310 via any suitable network or combination of networks such as the Internet, etc. and uses any suitable communication protocols such as Wi-Fi, Bluetooth, etc. Service infrastructure 302 may be built on the basis of cloud computing. API gateway 310 provides access to client applications like the active virtual machine 304A and the standby virtual machine 304B. API gateway 310 receives service requests issued by client applications and creates service lookup requests based on service requests. As a non-limiting example, in an embodiment, the user device 314 executes a routine to initiate interaction with the active virtual machine 304A. For instance, in some embodiments, the user accesses the active virtual machine 304A directly using a command line or GUI. Also, in some embodiments, the user accesses the active virtual machine 304A indirectly through the use of a web application that interacts with the active virtual machine 304A via the API gateway 310.

Figure 4:
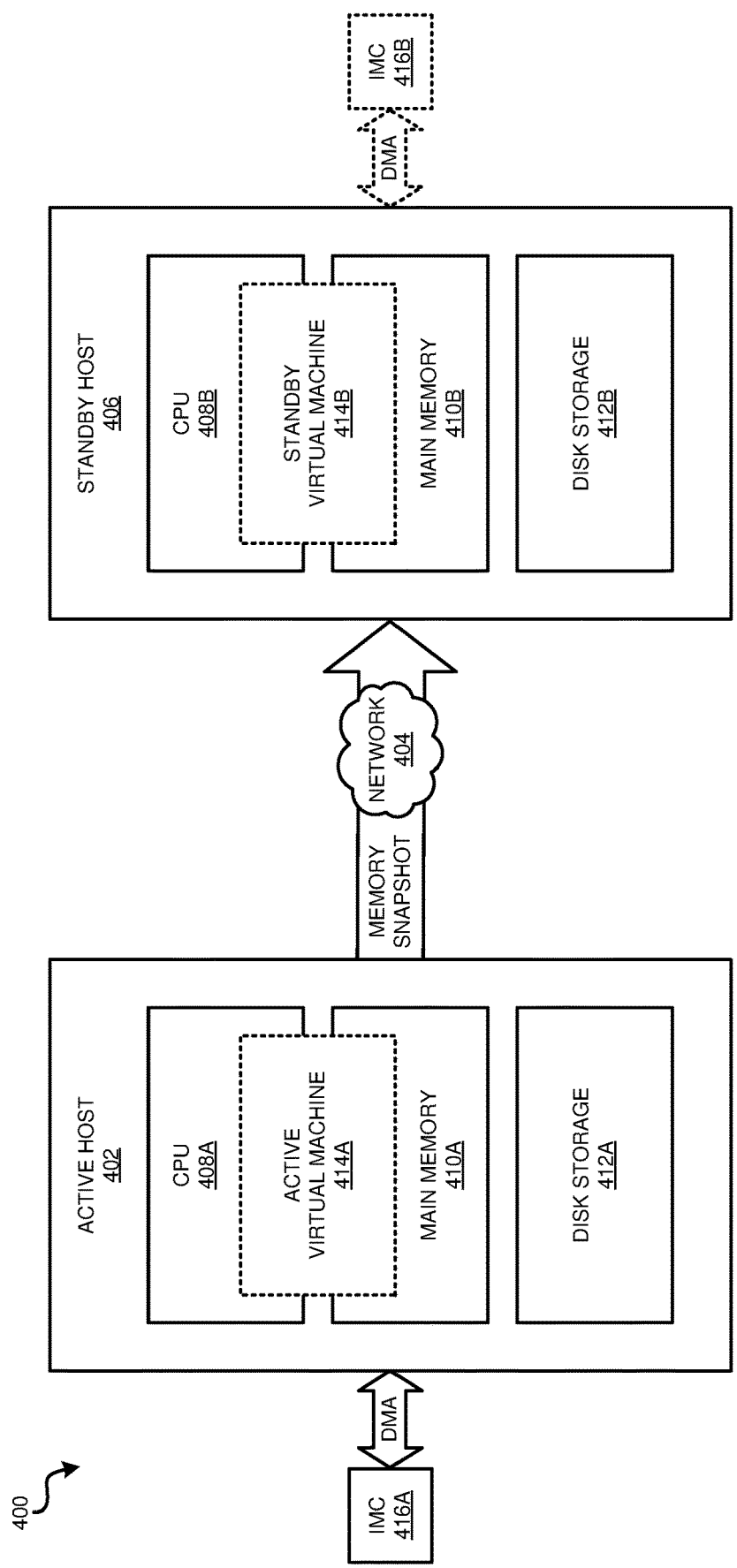
FIG. 4 depicts a block diagram of an example VM environment in accordance with an illustrative embodiment.

With reference to FIG. 4, this figure depicts a block diagram of an example VM environment 400 in accordance with an illustrative embodiment. The example embodiment includes an IMC 416A that provides for high-frequency memory synchronization between an active host 402 and a standby host 406 in accordance with an illustrative embodiment. In a particular embodiment, IMC 416A is an example of IMC 306 of FIG. 3, the active host 402 is an example of the active virtual machine 304A of FIG. 3, and the standby host 406 is an example of the standby virtual machine 304B of FIG. 3.

In the illustrated embodiment, the VM environment 400 generally includes an active host 402 and a standby host 406. The active host 402 and the standby host 406 can include computers or computing systems, such as a server, and can be referred to simply as "servers." The active host 402 and the standby host 406 may be implemented as cloud computing nodes 10 of FIG. 1. In some embodiments, the active host 402 and the standby host 406 are separate hardware devices. In some embodiments, the active host 402 and the standby host 406 are included on a single hardware device having two or more processors or processor cores.

In the illustrated embodiment, the active host 402 and the standby host 406 are in communication through a network 404. In some embodiments, the network 404 includes the Internet and/or aspects of the cloud computing environment 50 of FIG. 1 described above.

The active host 402 includes a CPU 408A, a main memory 410A, and a disk storage 412A; the standby host 406 includes a CPU 408B, a main memory 410B, and a disk storage 412B. The CPUs 408A/408B may contain one or more processors and may be implemented using one or more heterogeneous processor systems. The CPUs 408A/408B may be multi-core processors. The main memory 410A and/or 410B, and disk storage 412A and/or 412B are some examples of computer readable storage media. The main memory 410A and/or 410B is typically a form of electronic volatile memory, such as DRAM. The disk storage 412A and/or 412B is typically a form of non-volatile memory, such as a hard disk drive or solid-state drive. Instructions for an operating system, an object-oriented programming system, and applications or programs, are located on storage devices, such as on disk storage 412A and/or file storage 412B, and may be loaded into main memory 410A and/or 410B, for execution by the respective the CPU 408A or the CPU 408B. The processes of the illustrative embodiments may be performed by the CPU 408A and/or the CPU 408B using computer implemented instructions, which may be located in a memory, such as, for example, main memory 410A and/or main memory 410B. Main memory 410A/410B and disk storage file storage 412A/412B can be any suitable form of computer readable storage media.

In embodiments, the active host 402 executes the active virtual machine 414A. A virtual machine is a software implementation of a "machine" (e.g., a computing system) that executes applications or programs like a physical computing system or machine. The memory image and disk writes (which can correspond to a memory session and a "filesystem" associated with a virtual machine) for the virtual machine 414A are synchronized, mirrored, or replicated to the standby host 406 for the "back-up" or "standby" virtual machine 414B, which is not executing while virtual machine 414A is executing on the active host 402. In the event that the active host 402 fails or is no longer able to execute the active virtual machine 414A, the active virtual machine 414A "fails over" to the standby host 406, which can assume the execution of the standby virtual machine 414B. As such, the combination of the active host 402 and standby host 406 provide high availability for the active virtual machine 414A.

In some embodiments, the synchronization of two separate memory spaces is performed for the purpose of facilitating high availability of a running VM, such as active virtual machine 414A. In some embodiments, the synchronization allows failover in a stateful manner whereby CPU, memory, network, and disk storage are all snapshot in a coherent manner. In some embodiments, high-frequency snapshots of the states of the CPU, memory, network, and disk storage are collected from the active virtual machine 414A and transmitted to the standby virtual machine 414B as a "continuous flow" of updates. Increasing the frequency at which such high-frequency snapshots are collected and transmitted reduces potential data loss in the event of a failover. The period between snapshots is termed an epoch. In some embodiments, the period for an epoch may vary from one epoch to the next. For example, the period for an epoch may be driven by the time required to complete one or more transactions by the application running in the VM, e.g. a database committing a transaction.

In some embodiments, when a synchronization process is initiated at the end of an epoch, the operation of the active virtual machine 414A is temporarily suspended to allow the CPU registers and cache to be flushed so that an accurate state of the active virtual machine 414A can be captured and replicated on the standby virtual machine 414B. The IMC 416A is used to accelerate the synchronization process so as to minimize the amount of time that the active virtual machine 414A is suspended. Also, synchronization data that needs to be updated at the standby virtual machine 414B is transmitted to the IMC 416A using a high-speed data transfer technique, such as direct memory access (DMA), so as to minimize the amount of time that the active virtual machine 414A is suspended.

In some embodiments, the IMC 416A performs a data compression process that includes a modified XOR-RLE scheme that is optimized for existing accelerator devices, for example GPUs and FPGAs. In some such embodiments, the compression process is implemented with data parallelism such that many (e.g., thousands) of threads collectively perform the XOR-RLE processing.

The data flow can be split into active-side (encoding), which, in FIG. 4, is associated with the active host 402, and standby-side (decoding), which, in FIG. 4, is associated with the standby host 406. Both sides can be made more efficient with hardware-based concurrency, e.g., GPU or CPU threads, or FPGA intrinsically parallel circuit. In the illustrated embodiment, an IMC 416A uses a hardware accelerator, such as a GPU or FPGA, for encoding the data on the active side at active host 402, and the CPU 408A performs the decoding of the synchronization snapshot data on the decoding side at standby host 406. In some embodiments, the decoding side may include an optional IMC 416B that includes a hardware accelerator to perform the decoding. However, in some embodiments, there is less urgency to quickly decode the synchronization data than there is to encode the synchronization data because the active virtual machine 414A does not need to wait for the data to be decoded on the standby side before resuming operation. For example, in some embodiments, the active virtual machine 414A is initially suspended so that the synchronization data can be detected and transmitted to the IMC 416A, which encodes the data and sends it back to the active host 402 to be transmitted to the standby host 406. Once the data has been sent to the standby host 406, the active virtual machine 414A can resume operation. This means that the standby host 406 has until the end of the next epoch to complete the decoding.

Figure 5:
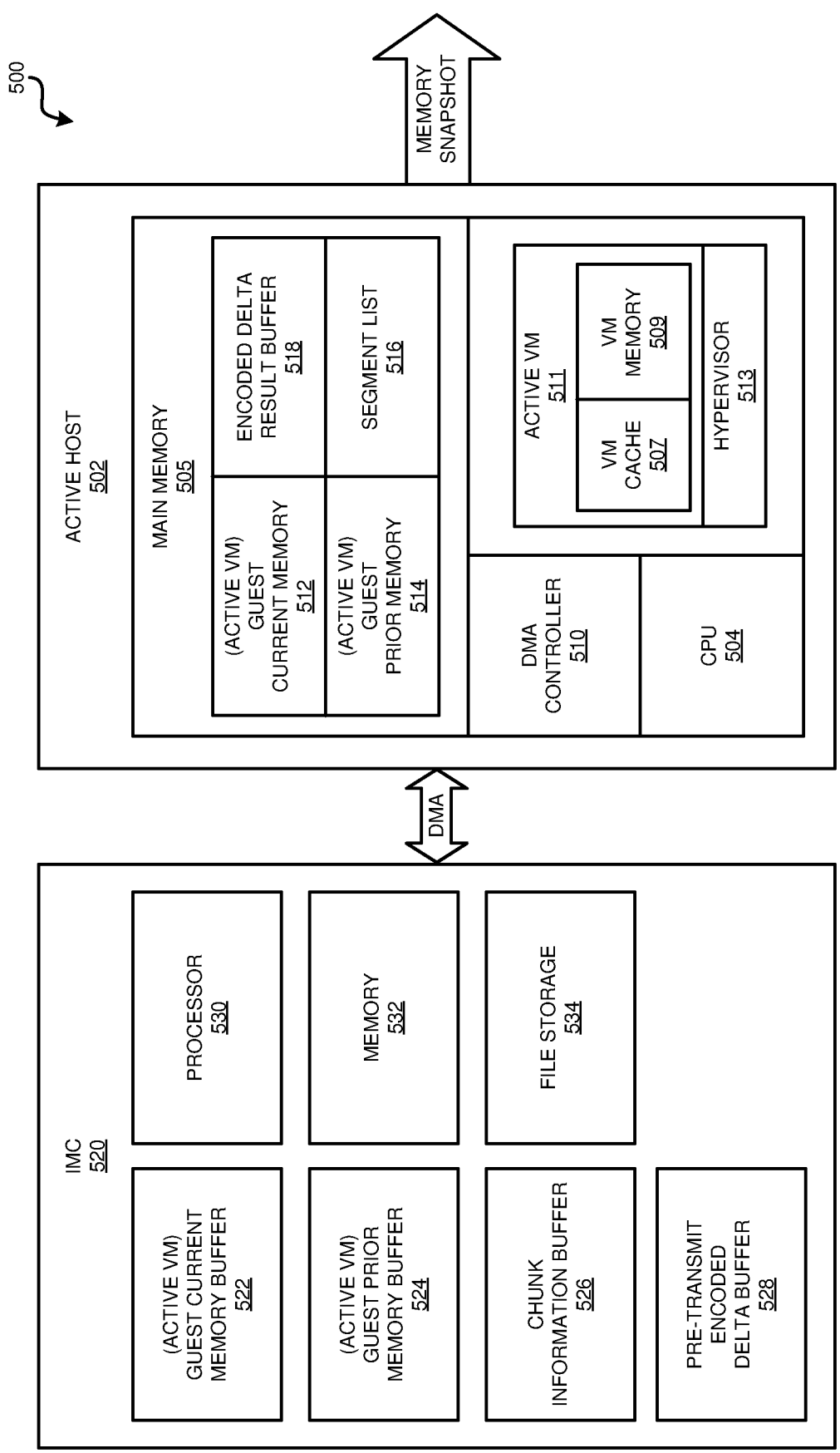
FIG. 5 depicts a block diagram of a VM environment in accordance with an illustrative embodiment.

With reference to FIG. 5, this figure depicts a block diagram of a VM environment 500 in accordance with an illustrative embodiment. The example embodiment includes an active host 502 and an IMC 520. In a particular embodiment, the active host 502 is an example of the active host 402 of FIG. 4 and the IMC 520 is an example of the IMC 416A of FIG. 4.

In the illustrated embodiment, the active host 502 includes a CPU 504, a DMA controller 510, and an active VM 511 loaded in a main memory 505 by the CPU 504 executing a hypervisor 513. The main memory 505 also includes guest current memory 512, guest prior memory 514, an encoded delta result buffer 518, and a segment list 516. The active VM 511 includes a VM cache 507 and a VM memory 509. The IMC 520 includes a guest current memory buffer 522, a guest prior memory buffer 524, a chunk information buffer 526, a pre-transmit encoded delta buffer 528, a processor 530, a memory 532, and a file storage 534. In alternative embodiments, the active host 502 and/or the IMC 520 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the processor 530 of the IMC 520 and the CPU 504 of the active host 502 perform various computational and data processing tasks, as well as other functionality. In some embodiments, the processor 530 includes a hardware accelerator, such as a GPU or FPGA. The processor 530 is in communication with memory 532 and file storage 534. The CPU 504 is in communication with the main memory 505. In some embodiments, the memory 532, the file storage 534, and the main memory 505 comprise one or more computer readable storage media with program instructions collectively stored on the one or more computer readable storage media, with the program instructions in the memory 532 or the file storage 534 being executable by the processor 530 to cause the processor 530 to perform operations described herein, and with the program instructions in the main memory 505 being executable by the CPU 504 to cause the CPU 504 to perform operations described herein.

In the illustrated embodiment, the IMC 520 manages synchronization of the VM memory 509 of the active VM 511 with the VM memory of a standby VM (e.g., standby virtual machine 414B). The IMC 520 synchronizes the VM memory 509 in a manner that allows a standby host to execute a standby VM that is equivalent to the active VM 511. In some embodiments, the IMC 520 synchronizes the active VM 511 many times per second using an epoch-based system in which execution of the active VM 511 is bounded by short pauses in execution in which changes to the VM memory 509 of the active VM 511 are captured and transmitted to a standby VM.

In some embodiments, the synchronizing procedure includes, once per epoch, the CPU 504 of the active host 502 pausing the running active VM 511 and identifying pages of the VM memory 509 of the active VM 511 that have changed during the present epoch (i.e., dirty pages). In some embodiments, after the active VM 511 has been suspended, the VM cache 507 is flushed and the hypervisor 513 iterates through a dirty page bitmap (a collection of bits representing the clean/dirty state of each page in the guest VM memory). The dirty page bitmap is used to construct the segment list 516, which is an array of non-contiguous dirty spans, where each element of the array includes respective segment offset, length pairs corresponding to identified contiguous dirty spans in the VM memory 509 (i.e., two adjacent dirty pages combine into a region defined by an element of the array).

In some embodiments, the synchronizing procedure includes the DMA controller 510 performing a DMA transaction to transfer the non-contiguous dirty spans of the VM memory 509 to a series of contiguous memory addresses of the guest current memory buffer 522 of the IMC 520. In some embodiments, the segment list 516 is the used to copy the contents of the non-contiguous dirty spans to guest current memory 512 of the active host 502 and via the DMA transaction into the guest current memory buffer 522 of the IMC 520 in packed form (i.e., in contiguous addresses). In some embodiments, the segment list 516 is also used to unpack the modified memory spans into their original locations at the standby VM.

In the illustrated embodiment, the active host 502 also includes a guest prior memory 514 that stores a state of the VM memory 509 prior to the current epoch. The IMC 520 includes a guest prior memory buffer 524 that also stores a state of the VM memory 509 prior to the current epoch. In some embodiments, where the IMC 520 is dedicated to the active VM 511, the IMC 520 maintains the guest prior memory buffer 524 between synchronization processes (i.e., during epochs). In some such embodiments, after the processor 530 has completed the encoding processing of the dirty spans in the guest current memory buffer 522, the processor 530 copies the contents of the guest current memory buffer 522 into the guest prior memory buffer 524 in preparation for the next epoch.

In some embodiments, the IMC 520 manages synchronization for a plurality of VMs, for example by being time multiplexed to manage synchronization for two or more VMs that have the timing of their synchronization routines offset in time from each other by enough time to complete the synchronization processing for one VM before a synchronization for a next VM begins. In such embodiments, the guest prior memory 514 is transmitted via a DMA transaction into the guest prior memory buffer 524 immediately before or after the dirty spans of the VM memory 509 are transferred via DMA transaction into the guest current memory buffer 522 of the IMC 520.

In some embodiments, the synchronizing procedure includes the processor 530 performing multi-threaded parallelized encoding processing of the dirty pages received from the active host 502. Data in the guest current memory buffer 522 and in the guest prior memory buffer 524 is all packed so as to occupy a continuous span of memory addresses in each buffer. The packed data is logically partitioned into "chunks" that can be encoded by separate threads. In some embodiments, the chunk information buffer 526 stores information about each chunk, for example a plurality of segment offset, length pairs corresponding to respective chunks. The size of the chunks must be sufficient to provide the granularity needed to parallelize across N worker threads, where N is a limitation of the underlying hardware (e.g., for GPU nominally 2048 threads). For example, in some embodiments, each separate thread performs XOR and RLE encoding on one or more chunks and creates a chunk-level result in the pre-transmit encoded delta buffer 528. The number N of worker threads can vary significantly for different target devices, being as small as 8-16 for a typical FPGA, limited by the concurrent memory access the device can support. In such cases, we can use sub-threads (sub-kernels) to pipeline the memory accesses within a thread, achieving much higher logical threads.

The process of performing the XOR-RLE encoding may be provided, for example, using Algorithm 1, provided below in pseudocode:

Algorithm 1: XOR-RLE Processing:

```
/* RLE encode - int32 granularity */
for (unsigned int i=0; i<ints_per_chunk;) {
    /* write XOR value */
    p_result[0] = p_a[i] ^ p_b[i];
    unsigned int count = 1;
    while( ( (p_a[i+count] ^ p_b[i+count]) == p_result [0]) &&
          (count+ i < ints_per_chunk)) {
        count++;
    }
    write run-length */
    p_result[1]=count;
    i += count;
    p_result +=2;
}
```

In some embodiments, a typical chunk size is 128 pages (512 KiB), however other chunk sizes can be used without departing from the present disclosure. As chunks are encoded, they are typically smaller in length than the original chunk size. The chunk position and length information are copied to the chunk information buffer 526. In some embodiments, the XOR+RLE encoded chunks are structured as shown in Table 1:

TABLE 1

| Offset Length Encoding | |
|---|---|
| XOR + RLE Data | 32 bit Value |
| | 32 bit Count |
| | ... |
| | 32 bit Value |
| | 32 bit Count | where:

$$\sum \left(\frac{\text{Count}}{4}\right) = \text{Chunk length in bytes}$$

If an XOR+RLE compressed chunk is larger than the original chunk size, e.g., due to high entropy modifications, then the original contents of the chunk (in guest current memory buffer 522) are copied to the pre-transmit encoded delta buffer 528, in which the chunks are structured as shown in Table 2:

TABLE 2

| Offset Length Encoding |
|---|
| Plain Data |

Note that in Table 1 and Table 2, in some embodiments, an encoding type is included to differentiate between XOR+RLE and plain data. In some embodiments, where there are only two encoding types, one bit is needed with a two-choice scheme.

Once the chunks have been processed the contents of the pre-transmit encoded delta buffer 528 can be transferred back to the encoded delta result buffer 518 on the active host 502. To achieve a packed result, the chunk info buffer 526 is first copied back to the active host 502. This chunk information {chunk offset, chunk length} is used to ensure efficient copy-back of the compressed chunks into a packed form on the active host 502, which is suitable for transmission to the standby host. Also, the encoded delta result buffer 518 includes the original segment list 516 that maps chunks to their original position in memory.

In some embodiments, the synchronizing procedure includes transmitting the results of the encoding processing to the standby host for decoding and updating the VM memory of a standby VM. In some embodiments, once the results of the encoding processing have been transmitted to the standby host, the active VM 511 is unpaused and execution resumes, which represents a transition into a new epoch.

Figure 6:
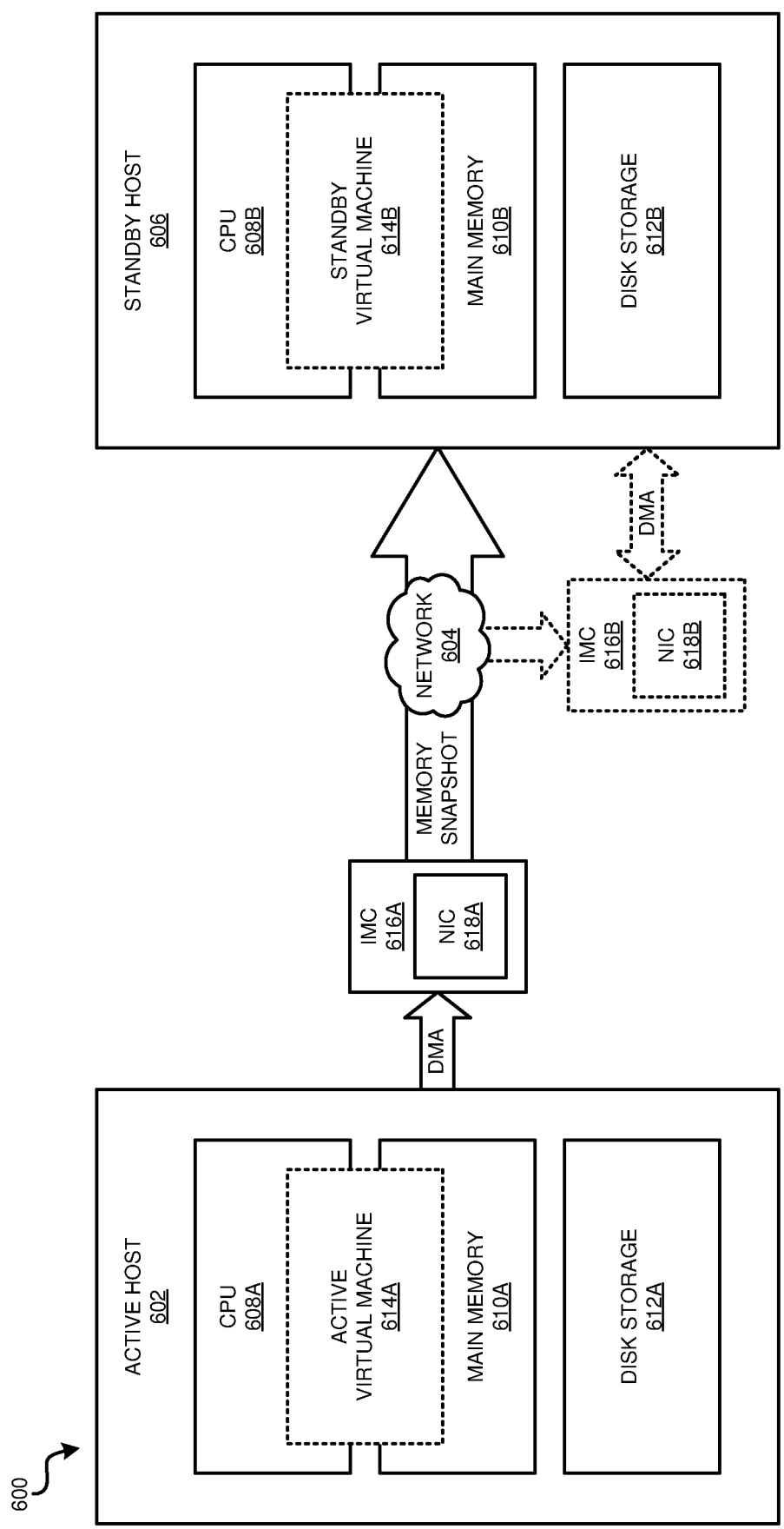
FIG. 6 depicts a block diagram of an example VM environment in accordance with an illustrative embodiment.

With reference to FIG. 6, this figure depicts a block diagram of an example VM environment 600 in accordance with an illustrative embodiment. The example embodiment is similar to the VM environment 400 of FIG. 4, except that in VM environment 600 the IMC 616A includes a NIC 618A that allows the IMC 616A to communicate with the standby host 606 over the network 604. In VM environment 400, the IMC 416A sends the synchronization data to the active host 402, which then transmits it to the standby host 406. In VM environment 600, the IMC 616A uses the NIC 618A to transmit the synchronization data (memory snapshot) to the standby host 606 without the need to first send it to the active host 602. The description of the active host 402 of FIG. 4 applies equally to the active host 602 and the description of the standby host 406 of FIG. 4 applies equally to the standby host 606. Also, in some embodiments, the standby host 606 uses an optional IMC 616B that includes a NIC 618B to receive and decode the synchronization data from the IMC 616A.

Figure 7:
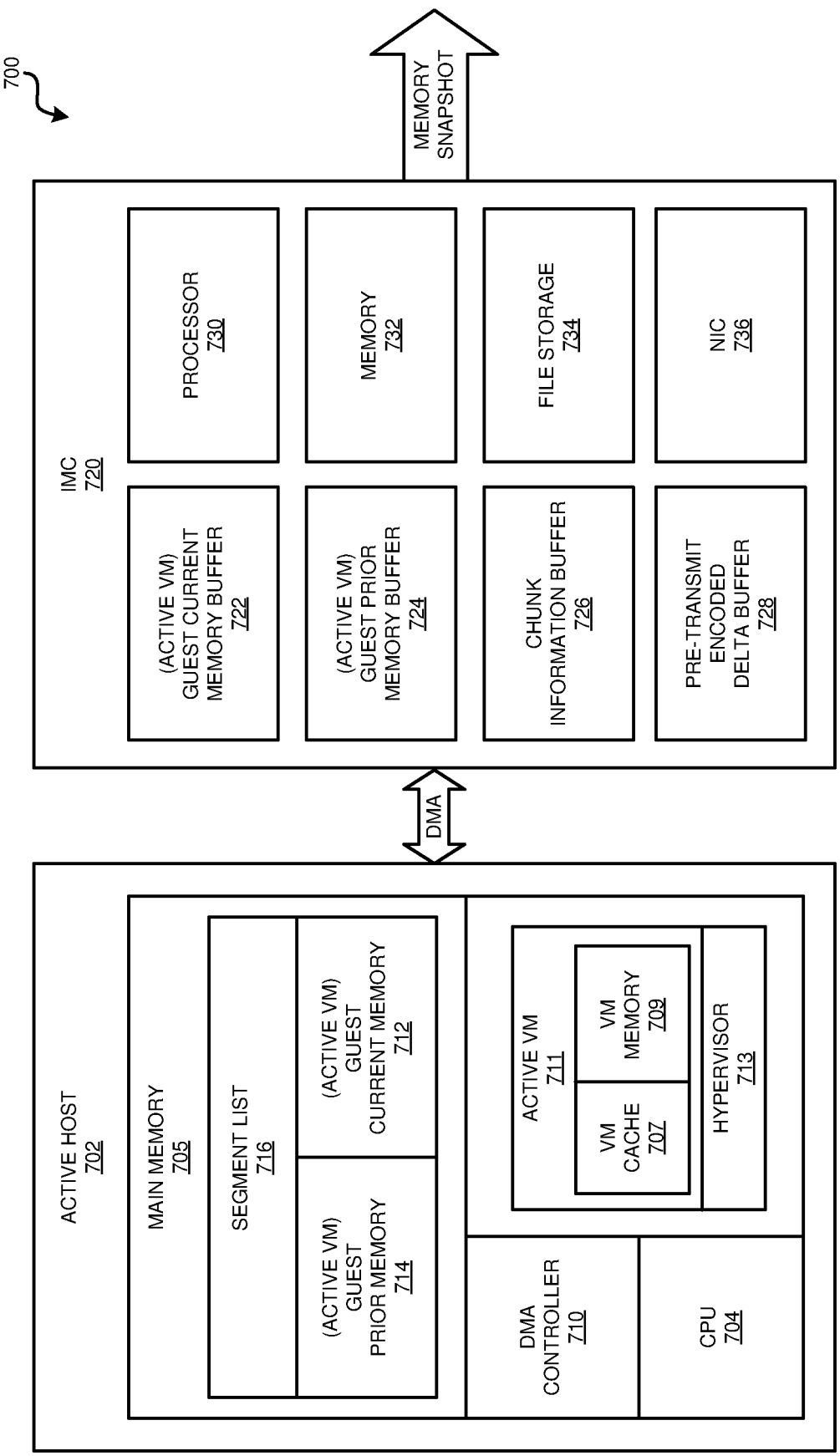
FIG. 7 depicts a block diagram of a VM environment in accordance with an illustrative embodiment.

With reference to FIG. 7, this figure depicts a block diagram of a VM environment 700 in accordance with an illustrative embodiment. The example embodiment is similar to the VM environment 500 of FIG. 5, except that in VM environment 700 the IMC 720 includes a NIC 736 that allows the IMC 720 to communicate with a standby host over a network. In VM environment 500, the IMC 520 sends the synchronization data to the active host 502, which then transmits it to a standby host. In VM environment 700, the IMC 720 uses the NIC 736 to transmit the synchronization data (memory snapshot) to a standby host without the need to first send it to the active host 702. The description of the active host 502 of FIG. 5 applies equally to the active host 702, except that the active host 702 does not require a results buffer, such as the encoded delta result buffer 518 of FIG. 5 since the IMC 720 is sending the results data directly to a standby host. The description of the IMC 520 of FIG. 5 applies equally to the IMC 720 except that the IMC 720 includes the NIC 736.

Figure 8:
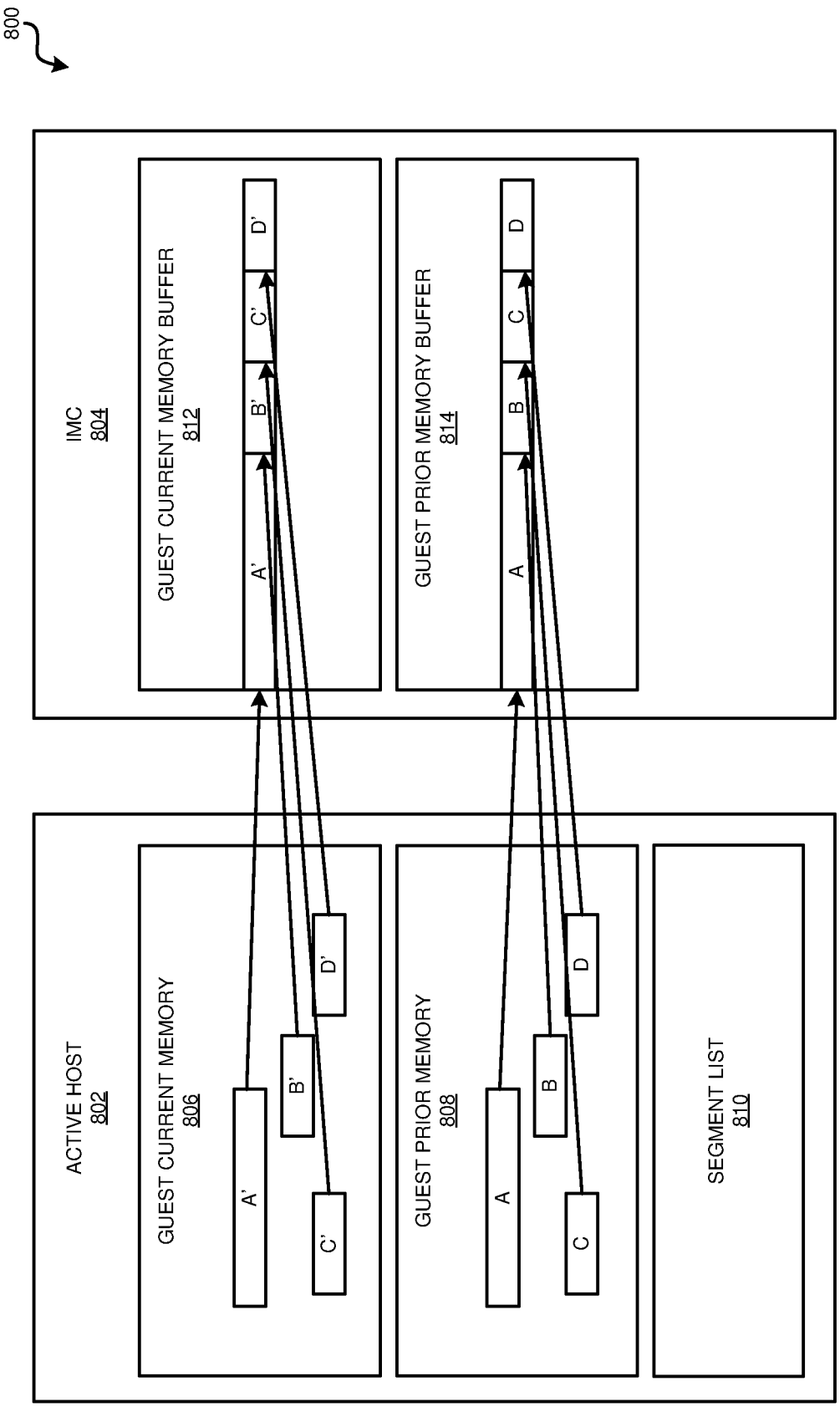
FIG. 8 depicts a block diagram of VM environment in accordance with an illustrative embodiment.

With reference to FIG. 8, this figure depicts a block diagram of VM environment 800 in accordance with an illustrative embodiment. The example embodiment includes an active host 802 and an IMC 804. The views of the active host 802 and IMC 804 are simplified to allow for a clear illustration of an embodiment of a DMA transaction. In some embodiments, the active host 802 is an example of an active host 402 of FIG. 4, an active host 502 of FIG. 5, an active host 602 of FIG. 6, or an active host 702 of FIG. 7. In some embodiments, the IMC 804 is an example of an IMC 306 of FIG. 3, an IMC 416A of FIG. 4, an IMC 520 of FIG. 5, an IMC 616A of FIG. 6, or an IMC 720 of FIG. 7.

In some embodiments, the synchronizing procedure includes, once per epoch, the active host 802 pausing the running active VM and identifying pages of the VM memory that have changed during the present epoch (i.e., dirty pages). In some embodiments, after the active VM has been suspended, the VM cache is flushed and the hypervisor iterates through a dirty page bitmap (a collection of bits representing the clean/dirty state of each page in the guest VM memory). The dirty page bitmap is used to construct the segment list 810, which is an array of non-contiguous dirty spans, where each element of the array includes respective segment offset, length pairs corresponding to identified contiguous dirty spans in the VM memory (i.e., two adjacent dirty pages combine into a region defined by an element of the array).

In some embodiments, the synchronizing procedure includes a DMA controller performing a DMA transaction to transfer the non-contiguous dirty spans of the VM memory, shown as non-contiguous spans A', B', C', and D' of guest current memory 806. The synchronizing procedure also includes a DMA controller performing a DMA transaction to transfer the same spans of a prior version of the memory, shown as spans A, B, C, and D of guest prior memory 808. In some embodiments, the prior version is the most recent prior version of the memory that was synchronized with a standby VM. In some embodiments, the segment offset and length of each of spans A, B, C, and D match the segment offset and length of each of spans A', B', C', and D'.

In the illustrated embodiment, the non-contiguous spans A', B', C', and D' are copied via a DMA transaction to a series of contiguous memory addresses of the guest current memory buffer 812 of the IMC 804. Also in the illustrated embodiment, the non-contiguous spans A, B, C, and D are copied via a DMA transaction to a series of contiguous memory addresses of the guest prior memory buffer 814 of the IMC 804. In the illustrated embodiment, the non-contiguous spans A', B', C', and D' are copied via a DMA transaction to a series of contiguous memory addresses of the guest current memory buffer 812 of the IMC 804. The packing of the data in the guest current memory buffer 812 and the guest prior memory buffer 814 allows the data to align with dense data computation that a hardware accelerator, such as a GPU or FPGA, is well suited to processing. This, in turn, allows the compression workload to be divided into chunks of packed data to support data parallelism. An output segment buffer can then be utilized to gather the encoded (compressed) data into contiguous memory for transmission to a standby VM.

Figure 9:
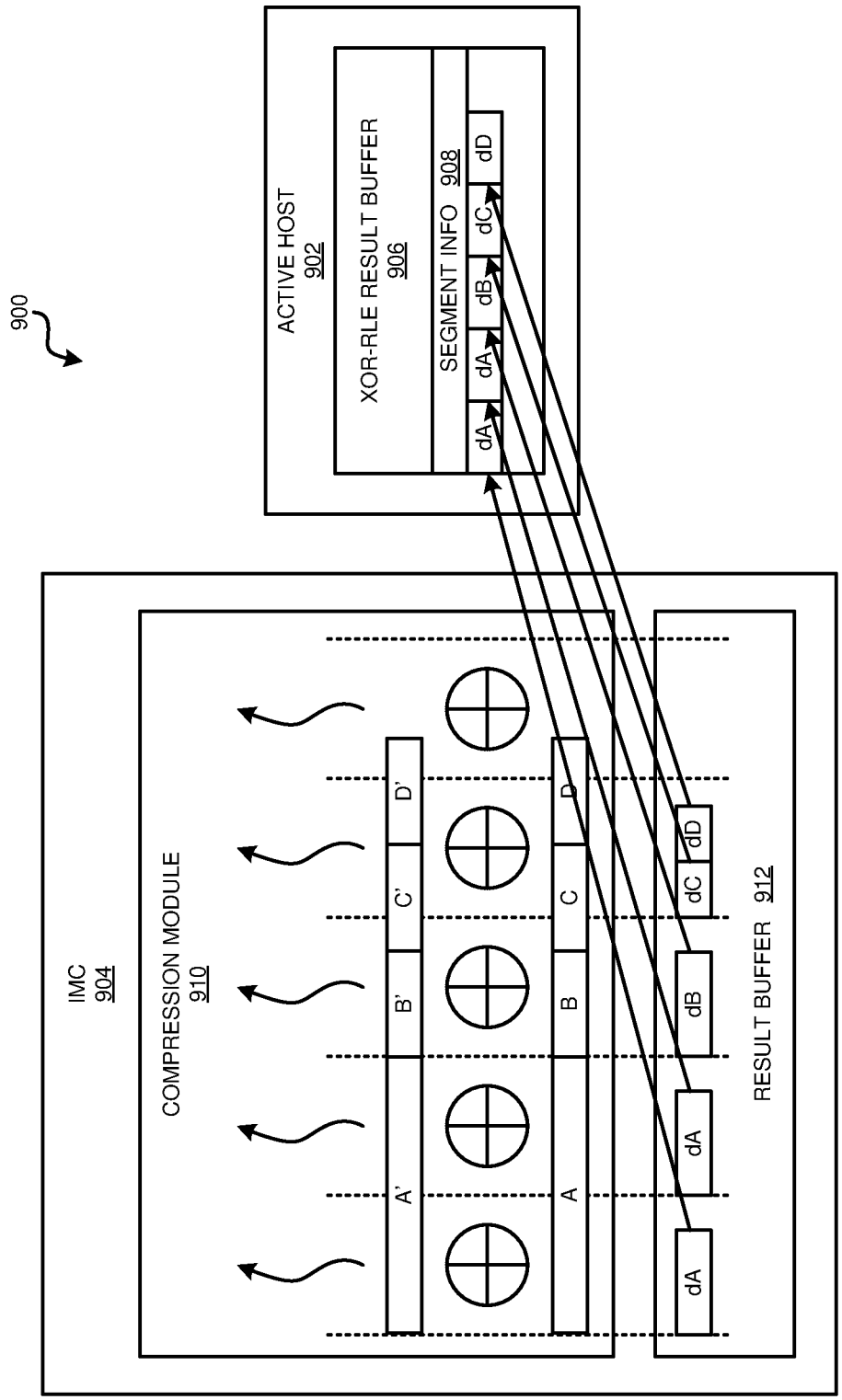
FIG. 9 depicts a block diagram of VM environment in accordance with an illustrative embodiment.

With reference to FIG. 9, this figure depicts a block diagram of VM environment 900 in accordance with an illustrative embodiment. The example embodiment includes an active host 902 and an IMC 904. The views of the active host 902 and IMC 904 are simplified to allow for a clear illustration of an embodiment of a multi-threaded XOR-RLE process in accordance with an illustrative embodiment. In some embodiments, the active host 902 is an example of an active host 402 of FIG. 4, an active host 502 of FIG. 5, an active host 602 of FIG. 6, or an active host 702 of FIG. 7. In some embodiments, the IMC 904 is an example of an IMC 306 of FIG. 3, an IMC 416A of FIG. 4, an IMC 520 of FIG. 5, an IMC 616A of FIG. 6, or an IMC 720 of FIG. 7.

In some embodiments, the synchronizing procedure includes a hardware accelerator performing multi-threaded parallelized encoding processing of the dirty pages received from the active host 902. Data spans A', B', C', and D' in the guest current memory buffer and data spans A, B, C, D in the guest prior memory buffer is all packed so as to occupy a continuous span of memory addresses in each buffer. The packed data is logically partitioned into "chunks" that can be encoded by separate threads. The size of the chunks must be sufficient to provide the granularity needed to parallelize across N worker threads, where N is a limitation of the underlying hardware (e.g., for GPU nominally 2048 threads). FIG. 9 shows five worker threads for the sake of simplicity. Actual implementations may include hundreds or thousands of threads.

In some embodiments, each separate thread performs XOR and RLE encoding in a compression module 910 on one or more chunks and creates respective chunk-level results dA, dA, dB, dC, and dD in result buffer 912. Once the chunks have been processed the contents of result buffer 912 can be transferred back to the XOR-RLE result buffer 906 on the active host 902. To achieve a packed result, the chunk info buffer is first copied back to the active host 902. This chunk information {chunk offset, chunk length} is used to ensure efficient copy-back of the compressed chunks into a packed form on the active host 902, which is suitable for transmission to the standby host. Also, the XOR-RLE result buffer 906 should include the original segment list that maps chunks to their original position in memory.

In some embodiments, the synchronizing procedure includes transmitting the results of the encoding processing to the standby host for decoding and updating the VM memory of a standby VM. In some embodiments, once the results of the encoding processing have been transmitted to the XOR-RLE result buffer 906, the active host 902 unpauses the active VM and execution resumes, which represents a transition into a new epoch.

Figure 10:
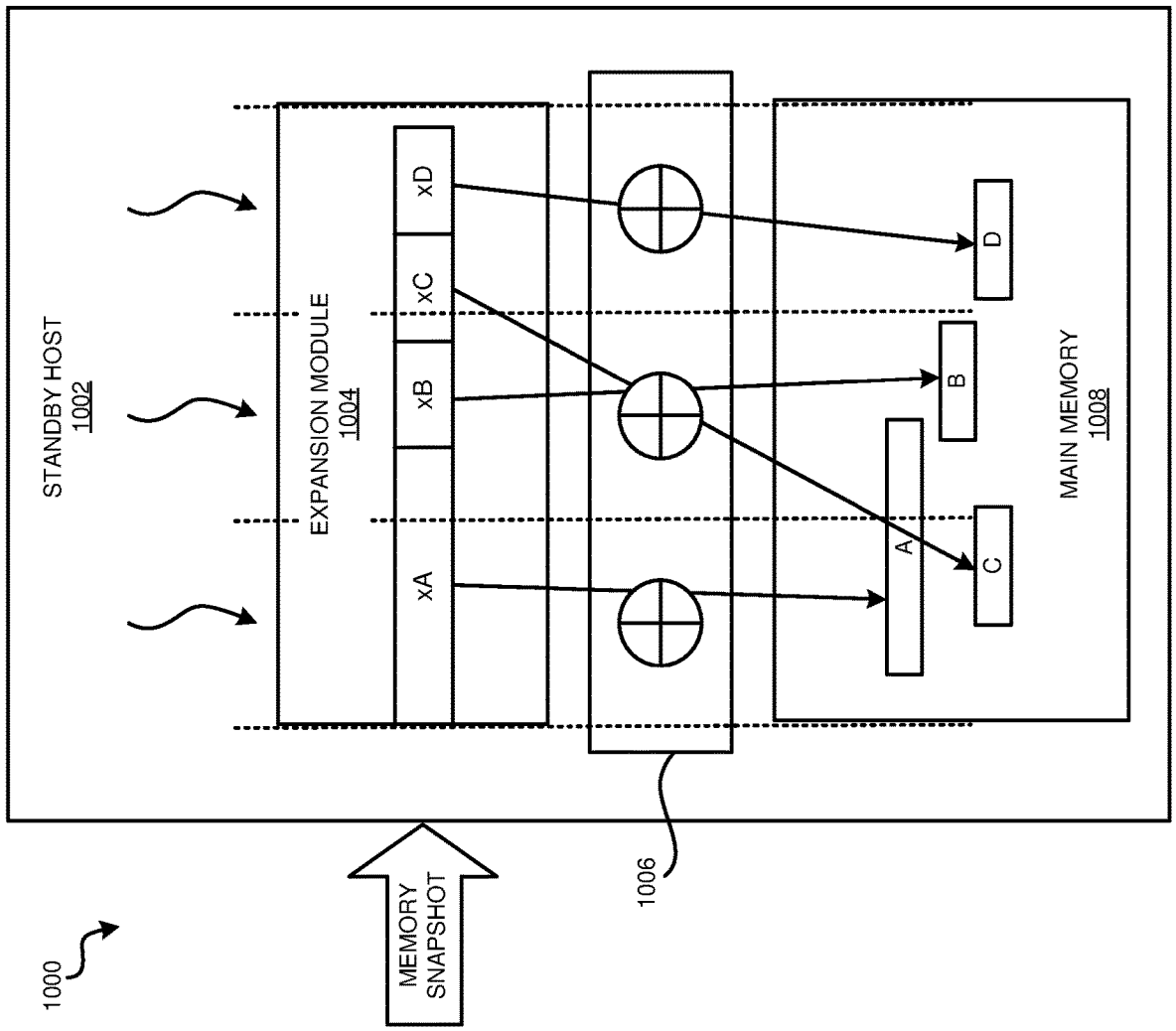
FIG. 10 depicts a block diagram of VM environment in accordance with an illustrative embodiment.

With reference to FIG. 10, this figure depicts a block diagram of VM environment 1000 in accordance with an illustrative embodiment. The example embodiment includes a standby host 1002. The view of the standby host 1002 is simplified to allow for a clear illustration of an embodiment of a multi-threaded XOR-RLE decoding process in accordance with an illustrative embodiment. In some embodiments, the standby host 1002 is an example of standby host 406 of FIG. 4 or standby host 606 of FIG. 6.

In the illustrated embodiment, the standby host 1002 receives the memory snapshot as synchronization data from an active VM, along with the segment information (e.g., segment information 908 of FIG. 9). The standby host 1002 performs decoding processing on the received synchronization data. In some embodiments, the expansion (decode) module 1004 detects the type of encoding for each chunk (XOR-RLE encoded or plain data), and then decodes (e.g., performs RLE-expansion on) each of the chunks that are marked as compressed (as opposed to plain data copy). Then, the XOR decode module 1006 performs an XOR operation on each chunk output from the expansion module 1004. In some embodiments, the XOR operation is performed directly in the standby guest VM main memory 1008 at the location indicated by the segment info offsets in the segment information that was transmitted from the active VM with the memory snapshot. The principal embodiment of the decoder is to use a streaming abstraction to "dispense" the encoded values (as 32-bit integers) which can be applied (XOR) or assigned (plain copy) to the regions of memory derived by parsing of the original segment list.

Figure 11:
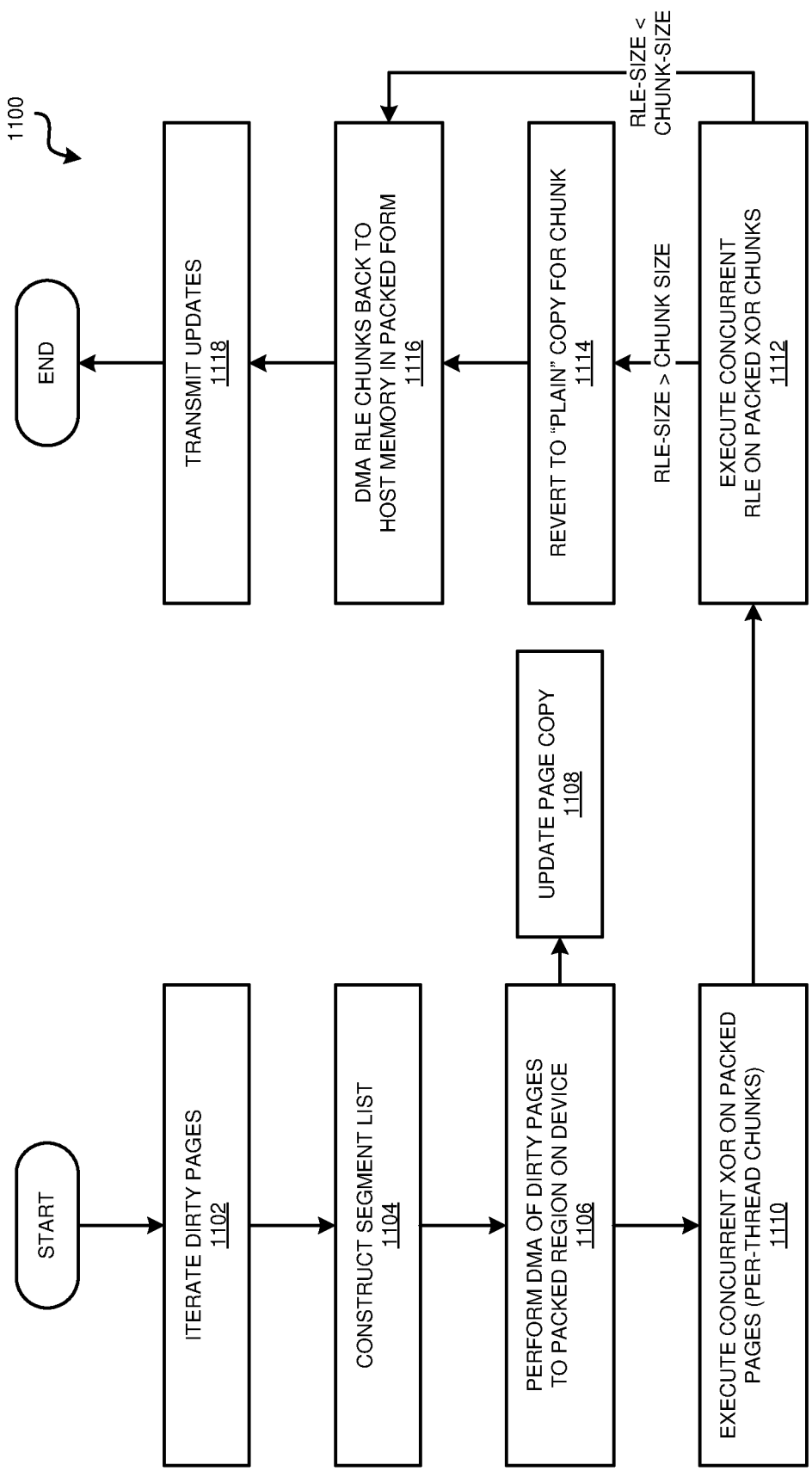
FIG. 11 depicts a flowchart of an example process for encoding processing in accordance with an illustrative embodiment.

With reference to FIG. 11, this figure depicts a flowchart of an example process 1100 for encoding processing in accordance with an illustrative embodiment. In a particular embodiment, the IMC 306, IMC 416A, IMC 520, IMC 616A, IMC 720, IMC 804, or IMC 904 carries out the process 1100.

In an embodiment, at block 1102, the synchronization process includes, once per epoch, an active host pausing a running active VM and identifying pages of the VM memory that have changed during the present epoch (i.e., dirty pages). In some embodiments, after the active VM has been suspended, the VM cache is flushed and the hypervisor iterates through a dirty page bitmap (a collection of bits representing the clean/dirty state of each page in the guest VM memory). Next, at block 1104, the synchronization process uses the dirty page bitmap to construct a segment list, which is an array of non-contiguous dirty spans, where each element of the array includes respective segment offset, length pairs corresponding to identified contiguous dirty spans in the VM memory (i.e., two adjacent dirty pages combine into a region defined by an element of the array).

Next, at block 1106, the synchronization process includes the DMA controller performing a DMA transaction to transfer the non-contiguous dirty spans of the VM memory to a series of contiguous memory addresses of the guest current memory buffer of the IMC. In some embodiments, the segment list is the used to copy the contents of the non-contiguous dirty spans via the DMA transaction into the guest current memory buffer of the IMC in packed form (i.e., in contiguous addresses). Also, at block 1108, the segment list is the used to copy the contents of the non-contiguous dirty spans to guest current memory of the active host.

At blocks 1110 and 1112, the synchronization process procedure includes a processor, preferably a hardware accelerator such as a GPU or FPGA, performing multi-threaded parallelized encoding processing of the dirty pages received from the active host. Data in the guest current memory buffer and in the guest prior memory buffer is all packed so as to occupy a continuous span of memory addresses in each buffer. The packed data is logically partitioned into "chunks" that can be encoded by separate threads. In some embodiments, the chunk information buffer stores information about each chunk, for example a plurality of segment offset, length pairs corresponding to respective chunks. The size of the chunks must be sufficient to provide the granularity needed to parallelize across N worker threads, where N is a limitation of the underlying hardware (e.g., for GPU nominally 2048 threads). For example, in some embodiments, each separate thread performs XOR (block 1110) and RLE (block 1112) encoding on one or more chunks and creates a chunk-level result in the pre-transmit encoded delta buffer. The number N of worker threads can vary significantly for different target devices, being as small as 8-16 for a typical FPGA, limited by the concurrent memory access the device can support. In such cases, we can use sub-threads (sub-kernels) to pipeline the memory accesses within a thread, achieving much higher logical threads.

Next, at blocks 1114 and (optionally, if the IMC lacks a NIC) 1116, the synchronization process proceeds based on the result of a comparison of the size of the XOR+RLE compressed chunk to the original chunk size. If the compressed version is larger, e.g., due to high entropy modifications, then at block 1114 the original contents of the chunk (in guest current memory buffer) are copied to the pre-transmit encoded delta buffer. Otherwise, at block 1116, the compressed version is copied to the pre-transmit encoded delta buffer. This comparison is made for each chunk individually until they have all been processed and stored in the pre-transmit encoded delta buffer.

Next, at block 1118, the synchronization process transfers the contents of the pre-transmit encoded delta buffer back to the encoded delta result buffer on the active host. The process then transmits the results of the encoding processing to the standby host for decoding and updating the VM memory of a standby VM.

Figure 12:
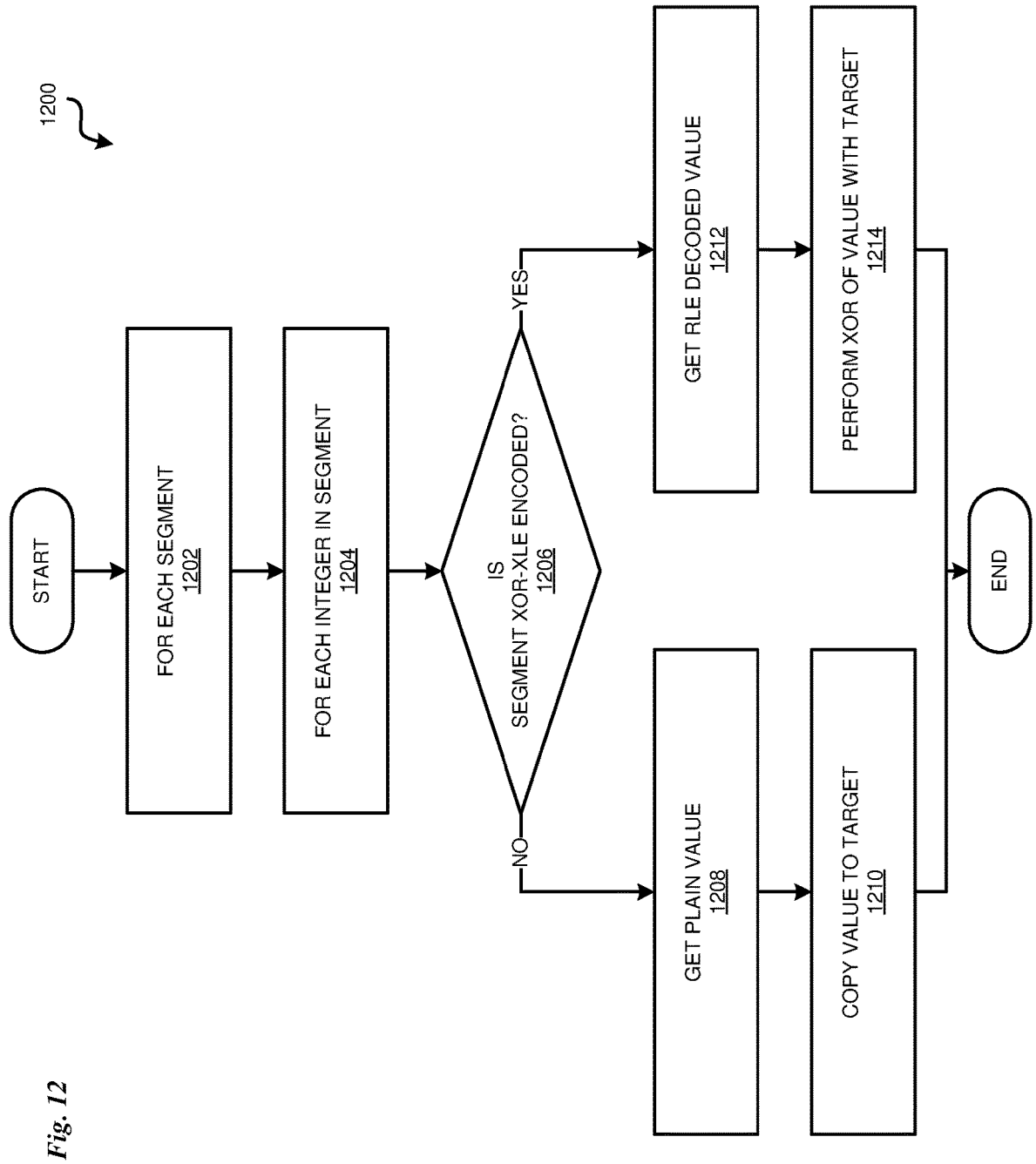
FIG. 12 depicts a flowchart of an example process for decoding processing in accordance with an illustrative embodiment.

With reference to FIG. 12, this figure depicts a flowchart of an example process 1200 for decoding processing in accordance with an illustrative embodiment. In a particular embodiment, the standby host 406, standby host 606, or standby host 1002 carries out the process 1100.

In an embodiment, at blocks 1202 and 1204, the process initiates recursive loops to iterate through each entry of each segment list. At block 1206, the process proceeds based on whether the current segment under evaluation is XOR-RLE encoded or plain data. If it is encoded, then at block 1212 the standby host performs decoding processing on the segment of data, for example by performing RLE-expansion on each of the chunks that are marked as compressed. Next, at block 1214 an XOR module performs an XOR operation on each chunk marked as compressed. In some embodiments, the XOR operation is performed directly in the standby guest VM main memory at the location indicated by the segment info offsets in the segment information that was transmitted from the active VM with the memory snapshot.

If, at block 1206 the segment is plain data, then the plain value of the data is extracted from the segment at block 1208. Next, at block 1210, the data is copied to a region of memory derived by parsing of the original segment list. The iterations of this process continue until all of the synchronization data has been processed and incorporated into the memory of the standby VM.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM) or Flash memory, a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   writing, by an intelligent memory controller (IMC), current snapshot data to a first series of contiguous memory addresses, wherein the current snapshot data is received by the IMC from a memory of an active virtual machine (VM) via a first direct memory access (DMA) transfer operation;
   executing, by the IMC, concurrent threads associated with respective spans of the contiguous memory addresses, wherein the concurrent threads control compression processing of respective portions of the current snapshot data resulting in corresponding portions of processed current snapshot data, wherein the concurrent threads comprise a first thread bound to a hardware accelerator that performs the compression processing of a first portion of the current snapshot data; and
   transmitting the processed current snapshot data to a standby VM as a current synchronization snapshot of the active VM.

2. The computer-implemented method of claim 1, wherein the current snapshot data is received by the IMC from a plurality of non-contiguous spans of memory of the active VM.

3. The computer-implemented method of claim 1, wherein the current snapshot data comprises pages of memory designated as having changed since a prior synchronization snapshot of the active VM,
   wherein the prior synchronization snapshot is represented as prior snapshot data.

4. The computer-implemented method of claim 3, further comprising:
   writing, by the IMC, the prior snapshot data to a second series of contiguous memory addresses, wherein the prior snapshot data is received by the IMC from the memory of the active VM via a second DMA transfer operation.

5. The computer-implemented method of claim 3, wherein the compression processing of the first portion of the current snapshot data comprises:
   performing, by the hardware accelerator, an exclusive OR operation between a raw-data version of the first portion of the current snapshot data and a corresponding raw-data version of a first portion of the prior snapshot data,
   wherein the exclusive OR operation results in a delta-encoded version of the first portion of the current snapshot data, and
   wherein the delta-encoded version is representative of memory changes in the first portion of the current snapshot compared to the corresponding first portion of the prior snapshot data.

6. The computer-implemented method of claim 5, wherein the compression processing of the first portion of the current snapshot data comprises:
   performing, by the hardware accelerator, a runtime length encoding (RLE) operation on the delta-encoded version of the first portion of the current snapshot data,
   wherein the RLE operation results in an RLE-encoded version of the first portion of the current snapshot data.

7. The computer-implemented method of claim 6, wherein the compression processing of the first portion of the current snapshot data comprises:
   outputting, as the first portion of the processed current snapshot data, a smaller of the raw-data version and the RLE-encoded version of the first portion of the current snapshot data.

8. The computer-implemented method of claim 7, further comprising:
   replacing, by the IMC, the prior snapshot data with the current snapshot data such that the current snapshot data is used as the prior snapshot data while generating a subsequent synchronization snapshot of the active VM.

9. The computer-implemented method of claim 1, wherein the hardware accelerator comprises a graphics processing unit (GPU).

10. The computer-implemented method of claim 1, wherein the hardware accelerator comprises a field-programmable gate array (FPGA).

11. A computer program product comprising one or more computer readable storage media, and program instructions collectively stored on the one or more computer readable storage media, the program instructions executable by a processor to cause the processor to perform operations comprising:
    writing, by an intelligent memory controller (IMC), current snapshot data to a first series of contiguous memory addresses, wherein the current snapshot data is received by the IMC from a memory of an active virtual machine (VM) via a first direct memory access (DMA) transfer operation;
    executing, by the IMC, concurrent threads associated with respective spans of the contiguous memory addresses, wherein the concurrent threads control compression processing of respective portions of the current snapshot data resulting in corresponding portions of processed current snapshot data, wherein the concurrent threads comprise a first thread bound to a hardware accelerator that performs the compression processing of a first portion of the current snapshot data; and
    transmitting the processed current snapshot data to a standby VM as a current synchronization snapshot of the active VM.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
    program instructions to meter use of the program instructions associated with the request; and
    program instructions to generate an invoice based on the metered use.

14. The computer program product of claim 11, wherein the current snapshot data is received by the IMC from a plurality of non-contiguous spans of memory of the active VM.

15. The computer program product of claim 11, wherein the current snapshot data comprises pages of memory designated as having changed since a prior synchronization snapshot of the active VM, wherein the prior synchronization snapshot is represented as prior snapshot data.

16. The computer program product of claim 15, further comprising:
writing, by the IMC, the prior snapshot data to a second series of contiguous memory addresses, wherein the prior snapshot data is received by the IMC from the memory of the active VM via a second DMA transfer operation.

17. A computer system comprising a processor and one or more computer readable storage media, and program instructions collectively stored on the one or more computer readable storage media, the program instructions executable by the processor to cause the processor to perform operations comprising:
writing, by an intelligent memory controller (IMC), current snapshot data to a first series of contiguous memory addresses, wherein the current snapshot data is received by the IMC from a memory of an active virtual machine (VM) via a first direct memory access (DMA) transfer operation;
executing, by the IMC, concurrent threads associated with respective spans of the contiguous memory addresses, wherein the concurrent threads control compression processing of respective portions of the current snapshot data resulting in corresponding portions of processed current snapshot data, wherein the concurrent threads comprise a first thread bound to a hardware accelerator that performs the compression processing of a first portion of the current snapshot data; and
transmitting the processed current snapshot data to a standby VM as a current synchronization snapshot of the active VM.

18. The computer system of claim 17, wherein the current snapshot data is received by the IMC from a plurality of non-contiguous spans of memory of the active VM.

19. The computer system of claim 17, wherein the current snapshot data comprises pages of memory designated as having changed since a prior synchronization snapshot of the active VM,
wherein the prior synchronization snapshot is represented as prior snapshot data.

20. The computer system of claim 19, further comprising:
writing, by the IMC, the prior snapshot data to a second series of contiguous memory addresses, wherein the prior snapshot data is received by the IMC from the memory of the active VM via a second DMA transfer operation.

* * * * *